Sept. 11, 1934. V. K. ZWORYKIN Re. 19,314
FACSIMILE TRANSMISSION SYSTEM
Original Filed March 26, 1929
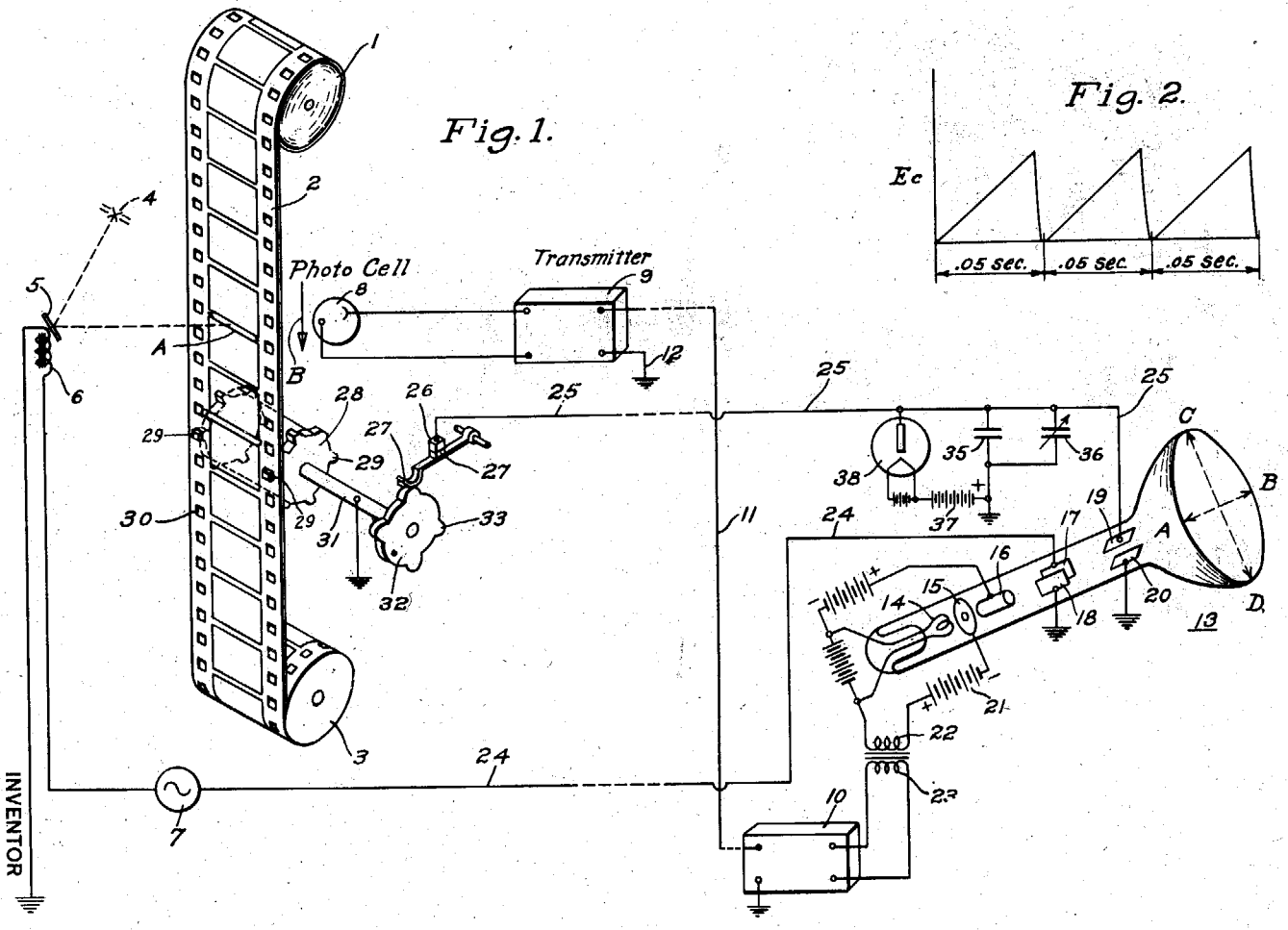
INVENTOR
Vladimir K. Zworykin.
BY
Wesley G. Carr
ATTORNEY Reissued Sept. 11, 1934 Re. 19,314

UNITED STATES PATENT OFFICE 19,314

FACSIMILE-TRANSMISSION SYSTEM

Vladimir K. Zworykin, Collingswood, N. J., assignor to Westinghouse Electric & Manufacturing Company, a corporation of Pennsylvania Original No. 1,786,812, dated December 30, 1930, Serial No. 349,956, March 26, 1929. Application for reissue December 23, 1932, Serial No. 648,718

22 Claims. (Cl. 178—69.5)

My invention relates to facsimile-transmitting systems and it has particular relation to systems especially adapted for the reproduction, at a distance, of moving-picture films.

One of the most troublesome problems connected with television systems and with systems for transmitting pictures and the like is that of securing motional synchronism between a scanning device at the sending station and an equivalent device at the receiving station. In systems adapted for distant reproduction, at one or more points, of a moving picture film, the difficulty of synchronization is increased by reason of the fact that the film, at the transmitting station, must be caused to pass in front of the scanning device at the same rate of speed that it traverses an ordinary moving-picture projector.

It is, accordingly, an object of my invention to provide an improved facsimile-transmission system wherein synchronism between a scanning device at a sending station and an analogous device at a receiving station is automatically maintained.

Another object of my invention is to provide a facsimile-transmission system particularly adapted for the reproduction, at a distance, of moving-picture films.

In practicing my invention, I prefer, at the sending station, to cause a motion picture film to travel at a fixed rate of speed between an oscillating mirror and a photoelectric cell. Light from a fixed source is directed against the mirror, and, after reflection therefrom, is focused to a fine point that moves from side to side of the moving film. Assuming that the film is moving vertically, the vertical component of the scanning motion is accordingly, provided for by the motion of the film, while the horizontal component is taken care of by the mirror-oscillations.

At the receiving station, I provide a Braun tube having a plurality of cathode-ray controlling devices mounted therein. One of the controlling devices functions in accordance with the output from the photoelectric cell at the sending station and serves to impose variations upon the amplitude of the ray; another of the controlling devices causes the ray to move horizontally to synchronism with the oscillating mirror at the sending station; while still another controlling device periodically deflects the ray vertically at a speed equal to the linear advance of the film at the sending station.

The novel features that I consider characteristic of my invention are set forth with particularity in the appended claims. The invention itself, however, both as to its organization and its method of operation, together with additional objects and advantages thereof, will best be understood from the following description of a specific embodiment, when read in connection with the accompanying drawing.

Figure 1 of the drawing is a diagrammatic view of a facsimile-transmission system comprising a preferred embodiment of my invention; and Fig. 2 is a diagram to which reference will hereinafter be made in describing the manner in which synchronism is secured.

The apparatus illustrated in the drawing comprises a film-storage reel 1 from which a motion-picture film 2 is withdrawn by a take-up reel 3. Neither motive power for the storage reel nor various incidental elements of the device, such as a guiding tube through which the film passes, lens systems, etc., are illustrated.

Light from a fixed source 4 is reflected upon the film from an oscillatory mirror 5 that is so arranged as to periodically cause the reflected ray to pass from side to side of the film as indicated by the arrow A. Any suitable means may be provided for causing the mirror to oscillate, such means being indicated by an inductor 6 energized from a source 7 of alternating current.

A photoelectric cell 8 is disposed immediately behind the film to receive the light which is reflected therethrough from the mirror 5. As the film travels in a downward direction, indicated by an arrow B, the ray of light reflected from the oscillatory mirror 5 falls upon each "frame" of the film in a zig-zag path, the longitudinal distance on the film between successive reversals of the path being a function of the speed of travel of the film and the rate of vibration of the mirror.

The light falling on the photoelectric cell is, at any instant, proportional to the transparency of the film, fluctuations in the output current from the cell, accordingly, being representative of the variations in density of the film where it is exposed to the scanning-ray.

By choosing the oscillation frequency of the mirror sufficiently high, in comparison with the film-speed, the scanning can, obviously, be accomplished by as fine a pencil of light as desired and the film can thus be transmitted with great fidelity.

The output current from the photo-cell, after the requisite amplification, is utilized to modulate a carrier-wave, in any well known manner, for either radio transmission to the distant receivers, or transmission thereto over metallic conductors, In order to simplify the drawing, the miscellaneous apparatus, incident to the amplification of the photo-cell current, the generation and modulation of the carrier-wave, the coupling devices for impressing the carrier current on the transmitting medium, etc., have been illustrated merely as a rectangular cabinet 9.

One of the output terminals of the transmitting apparatus 9 is connected to a distantly situated receiver 10 by a conductor 11 and the other terminal has a connection 12 to ground.

The receiver 10, preferably, comprises a plurality of high-frequency amplifying stages, a demodulator, and an audio-frequency amplifying stage if the picture transmisison is accomplished through the modulation of a carrier-wave. The particular type of receiver, however, constitutes specifically no part of the present invention, it being merely necessary to provide receiving apparatus of conventional type that will give an output proportional to such characteristic of the received signal that represents the varying translucence of the transmitted film. The amplitude of the output must be sufficient to control the magnitude of an electron stream in a Braun tube 13 and, consequently, the brilliancy of the fluorescence where the cathode stream therein strikes a screen at the end of the tube.

The Braun tube is preferably of the type having a thermionic cathode 14, a control element 15, an anode 16, a plurality of plates 17 and 18 for deflecting the electron stream in a direction indicated by the arrows A—B, and a plurality of plates 19 and 20 for deflecting the electron stream in a direction C—D at right angles to the direction A—B.

The control electrode 15 of the Braun tube is connected to the cathode thereof through a source 21 of biasing potential and the secondary winding 22 of a transformer. The primary winding 23 of the transformer is included in the output circuit of the receiver 10. The potential gradient between the control electrode and the cathode comprises two components, a direct-current biasing potential from the source 21, and an alternating potential representative of the picture-modulation of the incoming signal. Since the magnitude of the electron stream between the cathode 14 and the anode 16 is a function of the potential between the control-electrode and the cathode and, since the fluorescence of the screen at the end of the tube is a function of the magnitude of the electron stream or cathode ray, passing through the anode, the brilliance of the said fluorescence is, at any instant, proportional to the picture-modulation.

The deflecting plate 18 is connected to ground, and the opposite deflecting plate 17 is connected, by a conductor 24, to one of the terminals of the alternating-current source 7 that causes the mirror to oscillate. The other terminal of the alternating-current source is connected to ground through the actuating winding 6 of the oscillatory mirror.

The plate 20 of the pair of plates in the Braun tube that control the deflection of the electron stream in the direction of the arrows C—D is connected to ground, and the opposite plate 19 is connected, by a metallic conductor 25, to a fixed contact member 26 that is normally disconnected from a movable grounded contact 27.

As the film travels from the storage reel to the take-up reel, it is driven by a toothed wheel 28, the projections 29 of which engage a series of marginal perforations 30 in the film. The toothed wheel is connected, through a shaft 31, to a disc 32 that is provided with a plurality of peripheral projections 33. The free end of the contact member 27 normally rides upon the periphery of the disc 32, except at such times as the projections 33 engage it. The diameter of the disc and the number of projections thereon are so chosen that one of the projections raises the movable contact member 27 to engage the contact member 26 at each instant during the travel of the film that the scanning ray is about to leave the upper edge of one of the picture frames.

The plates 19 and 20, in the Braun tube, are connected across a condenser 35 having a vernier condenser 36 disposed in shunt thereto. The condenser 35 is so disposed as to be charged from a source 37 of constant current, a rectifying device 38, operating at or near saturation, preferably being utilized for placing the charge on the said condenser.

In the operation of the system as described, the film, in its travel between the storage and take-up reels, is exposed to a beam of light from the oscillating mirror that moves from side to side across it at a frequency corresponding to that of the alternating-current source. At the same time, since one terminal of the alternating-current source is connected to ground through the actuating winding of the mirror, and the other terminal is connected to ground through the capacity existing between the pair of deflecting plates 17 and 18 nearest the anode in the Braun tube, the electron stream in the said Braun tube oscillates from side to side in the direction of the arrows A—B at the same frequency that the ray of light is being caused to traverse the moving film.

One coordinate of the scanning operation, at the receiver, is, accordingly, provided by the direct connection between the alternating-current source that actuates the mirror and the first pair of deflecting plates.

It is necessary, however, to provide the coordinate of the scanning operation corresponding to the longitudinal motion of the film at the transmitting end. This coordinate is provided by the gradual building up, from the rectifying device, of a charge upon the condenser connecter across the pair of deflecting plates 19 and 20. The size of the condenser and the potential of the source are so chosen that the charge upon the condenser plates will build from zero to the desired maximum during the time required for the film at the transmitter to travel a distance corresponding to the distance between the centers of the spaces bounding a single picture-frame of the film.

Accordingly, if, at the instant the light from the oscillating mirror starts to traverse any given picture frame, the charge upon the deflecting plates 19 and 20 is zero or substantially zero, the successive portions of the path traced by the scanning light on the film will be represented by successive shifts of the electron stream in the Braun tube in the direction of the arrows C—D, the rate of shift being determined by the rate at which the condenser charges and being made equivalent to the film-speed.

In order, therefore, that the condenser shall be in the discharged state at the beginning of the scanning operation of each picture frame, the peripheral projections upon the disc are so chosen and spaced that the contact 26 is connected to ground, by reason of the engagement therewith of the contact member 27, at each instant when the light ray from the oscillating mirror strikes a point midway between successive frames of the moving film.

The periodic charge and discharge of the condenser is illustrated graphically in Fig. 2, wherein distances on the Y-axis represent potentials existing across the pair of deflecting plates 19 and 20, and distances along the X-axis are representative of time. From an inspection of Fig. 2, it will be noted that the potential across the condenser is indicated as rising gradually from zero to its maximum in a period of 1/20th of a second and then dropping quickly to zero. The charging period chosen corresponds to a film speed of substantially 20 pictures per second, which speed is ample for the satisfactory transmission of pictures.

If it is desired to transmit a combined picture-and-sound film, the film speed may be increased and the condenser may be reduced in capacity, proportionally, in order that it shall acquire its charge in a shorter space of time.

Although not illustrated in the drawing, in certain instances, it has been found necessary to interpose loading coils in the conductors extending between the transmitting and the receiving station in order that the distributed capacity of the lines shall not prevent proper synchronization of the electron-stream travel in the receiving tube with the rate of oscillation of the scanning mirror and the film speed at the transmitting end.

It is quite feasible to dispense with all metallic conductors between the transmitting and the receiving stations and to utilize separate carrier frequencies for conveying both the timing impulses and the picture impulses, or these impulses may be conveyed as separate modulations over the same carrier wave. Various methods for substituting radio transmission for metallic conductors are well known to those skilled in the art to which my invention pertains and I have, accordingly, not illustrated any specific apparatus for adapting my invention to radio.

It will accordingly be apparent that I have provided a novel method of securing synchronism between a scanning operation at the transmitting end of a television or facsimile-transmission system and the scanning operation at the receiving end. The rate of shift of the cathode ray may be very accurately correlated to the film-speed and, since the beginning of the scanning operation for each picture frame at the receiver is positively controlled by the movement of the film at the transmitter, the received picture is remarkably free from the usual annoying tendency to move "out of frame".

Although I have chosen a specific embodiment of my invention for purposes of illustration and description, many modifications thereof will be apparent to thse skilled in the art. My invention, therefore, is not to be restricted except insofar as is necessitated by the prior art or by the spirit of the appended claims.

I claim as my invention:

1. In a television system, means for causing a local scanning operation in synchronism with a distant scanning operation and means for modifying said local scanning operation in accordance with a movement of an object subjected to said distant scanning operation.

2. In a television system, means for causing a local scanning operation in synchronism with a distant scanning operation and means for introducing a periodic modification of said local scanning operation in accordance with a movement of an object subjected to said distant scanning operation.

3. In a television system, means for causing a local scanning operation in synchronism with a distant scanning operation and means for causing a periodic repetition of said local scanning operation in accordance with a movement of an object subjected to said distant scanning operation.

4. In a television system, means for causing a local scanning operation in one dimension in synchronism with a distant scanning operation and means for causing periodic repetition of said local scanning operation in accordance with a movement of an object subjected to said distant scanning operation, whereby two dimensional scanning is locally obtained.

5. In a television system, electromagnetic means for causing a local scanning operation in synchronism with a distant scanning operation and electrostatic means for causing repetitions of said local scanning operation in accordance with a movement of an object subjected to said distant scanning operation.

6. In a television system, electromagnetic means for causing a local scanning operation in synchronism with a distant scanning operation, electrostatic means for causing repetitions of said local scanning operations and means whereby the influence of said electrostatic means on said scanning operation is controlled in accordance with a movement of an object subjected to said distant scanning operation.

7. In a television system, receiving apparatus including a ray-receptive screen, means for generating a ray, means for causing said ray to traverse said screen in one dimension in accordance with a distant scanning operation and means for causing said ray to repeatedly traverse said screen in accordance with a movement of an object subjected to said distant scanning operation.

8. In a television system, means for causing a local scanning operation in synchronism with a distant scanning operation and means controlled in accordance with the rate of motion of the subject subjected to the distant scanning operation for producing a saw-tooth wave of potential and means for utilizing said saw-tooth wave of potential to produce periodic modifications of the local scanning operation.

9. In a system for producing television images from motion picture film, means for causing a local image reproduction operation in synchronism with a distant film scanning operation and means controlled by and in accordance with the rate of motion of the film subject subjected to the distant scanning operation for producing a saw-tooth voltage wave for causing periodic modification of the local scanning operation.

10. In a television system, a film subject of which the electro-optical image is to be produced, means to move the film subject past a predetermined plane at a predetermined rate, means for scanning the film along a repeated series of transverse elemental strips for producing a series of energy impulses representative of the light intensities thereof, means to convert upon an observation area the energy impulses into electro-optical effects representative of the light values on the scanned areas of the film subject in one dimension, means to synchronize the areas at which the electro-optical effects become observable upon the observation area with the scanning operation, and means for progressively changing the path of the observable effects upon the observation area in a second dimension in accordance with a saw-tooth path, and means controlled by the movement of said film for defining the saw-tooth peaks in accordance with the rate at which successive film-frames of the scanned film subject move past the predetermined plane.

11. In a system for producing at a distant point television images of successive film frames of a motion picture film, means for moving the film continuously at a predetermined rate past a predetermined point at the transmitting end of the system, means at the transmitting end of the system for scanning in sequence successive elemental areas of an elemental transverse strip of the film to scan the film in one direction, means at a receiving end of the system for producing at successive elemental areas of a viewing plane electro-optical effects representative of the varying values of light and shadow of the scanned elemental strip to reconstruct in one direction the film image, and means at receiving points to produce electrical effects controlled by the film motion at the transmitting point to cause the film image to assume on the viewing plane a two-dimensional effect, said electrical effects varying substantially linearly from zero value to a maximum in substantially the time required to move a single film frame of the film subject at the transmitting point past the predetermined plane of analization and changing from a maximum value to a minimum during the transition period between scanning adjacent film frames on the scanned film.

12. In a system for producing at a distant point electro-optical images of successive film frames of a motion picture film, means for moving the film continuously so that a predetermined number of film frame areas pass a predetermined point at the transmitting end of the system per unit time period, means at the transmitting end of the system for scanning in sequence successive elemental areas of successive elemental transverse strips of the film to scan the film, means at a receiving end of the system for producing upon successive adjacent elemental areas of a viewing plane electro-optical effects representative of the varying values of light and shadow of the scanned elemental strips of the film to reconstruct in one direction the film image, and means at the receiving point to produce image position controlling electrical effects controlled by the motion of the film at the transmitting point to cause the reconstructed images to assume on the viewing plane a two-dimensional effect, said position controlling electrical effects changing in amplitude substantially linearly from zero value to a maximum during the unit time period required to move the predetermined number of film frame areas of the film subject at the transmitting point past the predetermined plane of scanning and changing from a maximum amplitude to a minimum amplitude under the control of the transmitter during the transition period between the scanning at the transmitter of successive film frame areas on the film.

13. In a system for producing electro-optical effects on a viewing plane which represent the action portrayed by the projection of a motion picture film, means for moving a motion picture film at the point of transmission past a predetermined elemental plane at a predetermined rate, means for scanning the film section passing the elemental plane so as to test successive adjacent element areas of a transverse section of the film for varying intensities of light and shadow, means for transmitting and receiving signals representative of the varying intensities of light and shadow represented by the elemental areas scanned, means to produce at a receiving point from the received signals electro-optical effects in a predetermined plane representative of the light values upon a similar elemental plane of the scanned film subject at the point of transmission, means at the point of reproduction of the electro-optical effects for producing electrical signals increasing linearly from a minimum amplitude toward a maximum amplitude to shift the plane at which the electro-optical images effects are observable, and means under control of the movement of said film at the point of transmission, operative intermittently at each time period when a predetermined linear section representative of a single film frame of the scanned film passes the predetermined plane of scanning, for producing an electrical effect to cause the signals controlling the viewing plane of observation of the produced electro-optical effects representative of the film subject at the point of transmission to change suddenly in amplitude from a maximum to a minimum so that successively received image signals cause the electro-optical effects to be produced upon identical viewing planes at a rate at least equal to the frequency of the persistance of vision phenomena.

14. In a system for producing electro-optical effects on a viewing plane which represent the action portrayed by the projection of a motion picture film, means for continuously moving successive elemental strips of a motion picture film at the point of transmission past a predetermined elemental plane of scanning at a predetermined rate, means for scanning the film section passing the elemental plane so as to test successive adjacent elemental areas of a transverse section of the film for varying intensities of light and shadow, means for transmitting and receiving signals representative of the varying intensities of light and shadow represented by the elemental areas scanned, means to produce at a receiving point from the received signals electro-optical effects in a predetermined plane representative of the light values upon a similar elemental plane of the scanned film subject at the point of transmission, means at the point of reproduction of the electro-optical effects for producing electrical signals normally tending to increase along a linear path from a minimum amplitude toward a maximum amplitude to shift the plane at which the produced electro-optical image effects are observable, and means at the point of transmission and under control of said film, said means being operative intermittently at each time period that a predetermined linear section of the scanned film representative of a single film frame passes the predetermined plane of scanning for producing an electrical effect to cause the signals controlling the plane of observation of the electro-optical effects representative of the film subject at the point of transmission to change suddenly in amplitude from a maximum to a minimum so that successively received image signals cause the elctro-optical effects to be produced upon identical viewing planes at a rate at least equal to the frequency of the persistance of vision phenomena.

15. In a system for producing electro-optical effects upon the flourescent end wall of a cathode ray tube which represent the action portrayed by the projection of a motion picture film, means for continuously moving a motion picture film at the point of transmission past a predetermined elemental plane of scanning at a predetermined rate, means positioned at the plane of scanning for scanning the film section passing the elemental plane so as to test successive adjacent elemental areas of successive transverse sections of the film for varying intensities of light and shadow, means for transmitting and receiving signals representative of the varying intensities of light and shadow represented by the elemental areas scanned, a cathode ray device at the receiving point to produce from the received signals controlled intensity electro-optical effects representative of the film section scanned, means to move the cathode ray in one plane synchronously with the scanning motion along a related elemental plane of the scanned film subject at the point of transmission, means at the point of reproduction of the electro-optical effects for producing electrical signals increasing linearly from a minimum amplitude toward a maximum amplitude to shift the plane of the cathode ray producing the electro-optical image effects, and means at the point of transmission operative intermittently at each time period that a predetermined linear section of the scanned film representative of a single film frame passes the predetermined plane of scanning for producing an electrical effect to cause the signals controlling the plane of observation of the cathode ray producing electro-optical effects representative of the film subject at the point of transmission to change suddenly in amplitude from a maximum to a minimum so that successively received image signals cause the electro-optical effects to be produced upon identical viewing planes at a rate at least equal to the frequency of the persistance of vision phenomena.

16. In a television system, means for producing a scanning operation at a local station and maintaining said scanning operation in synchronism with a corresponding scanning operation at a distant station, a movable subject under scansion at said second station, and means at said local station for modifying said local scanning operation in response to the movement of said subject under scansion.

17. In a television system, means for producing a scanning operation at a local station and maintaining said scanning operation in synchronism with a corresponding scanning operation at a distant station, a movable subject under scansion at said second station, and means at said local station for periodically modifying said local scanning operation in response to the movement of said subject under scansion.

18. In a television system, means for causing a local scanning operation in synchronism with a distant scanning operation and means responsive to a movement of an object subjected to said distant scanning operation for modifying said local scanning operation in accordance with said movement of said object subjected to said distant scanning operation.

19. In a television system, means for causing a local scanning operation in synchronism with a distant scanning operation and means for causing a periodic modification of said local scanning operation in accordance with a movement of an object subjected to said distant scanning operation.

20. In a television system, means for causing a local scanning operation in one dimension in synchronism with a distant scanning operation and means for causing periodic modification of said local scanning operation in accordance with a movement of an object subjected to said distant scanning operation whereby two dimensional scanning is locally obtained.

21. In a television system, electromagnetic means for causing a local scanning operation in synchronism with a distant scanning operation, electrostatic means for causing a periodic modification of said local scanning operation and means whereby the influence of said electrostatic means on said scanning operation is controlled in accordance with a movement of an object subjected to said distant scanning operation.

22. In a television system, electromagnetic means for causing a local scanning operation in synchronism with a distant scanning poeration and electrostatic means for causing periodic modifications of said local scanning operation in accordance with a movement of an object subjected to said distant scanning operation.

VLADIMIR K. ZWORYKIN.